Patented Dec. 6, 1938

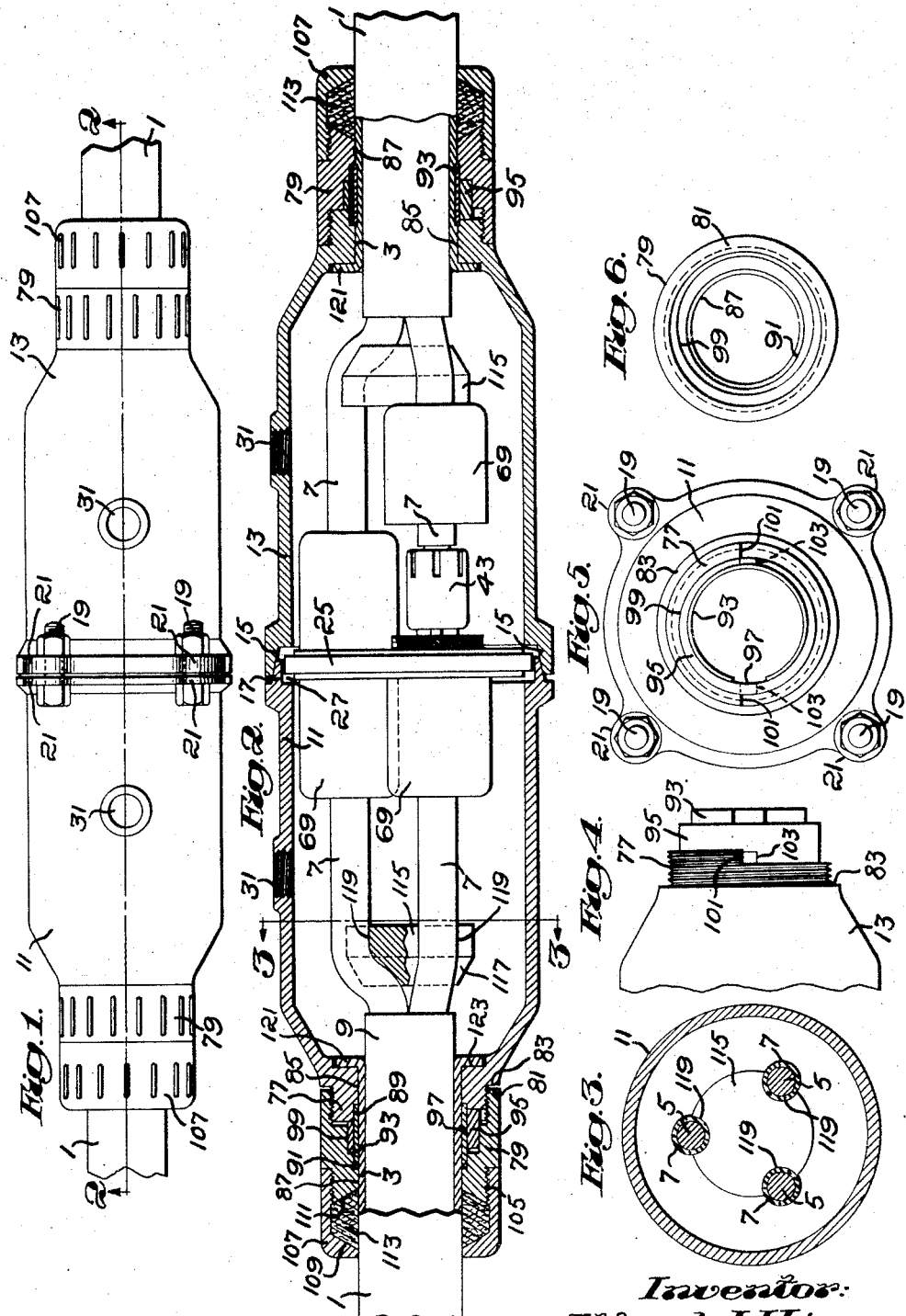

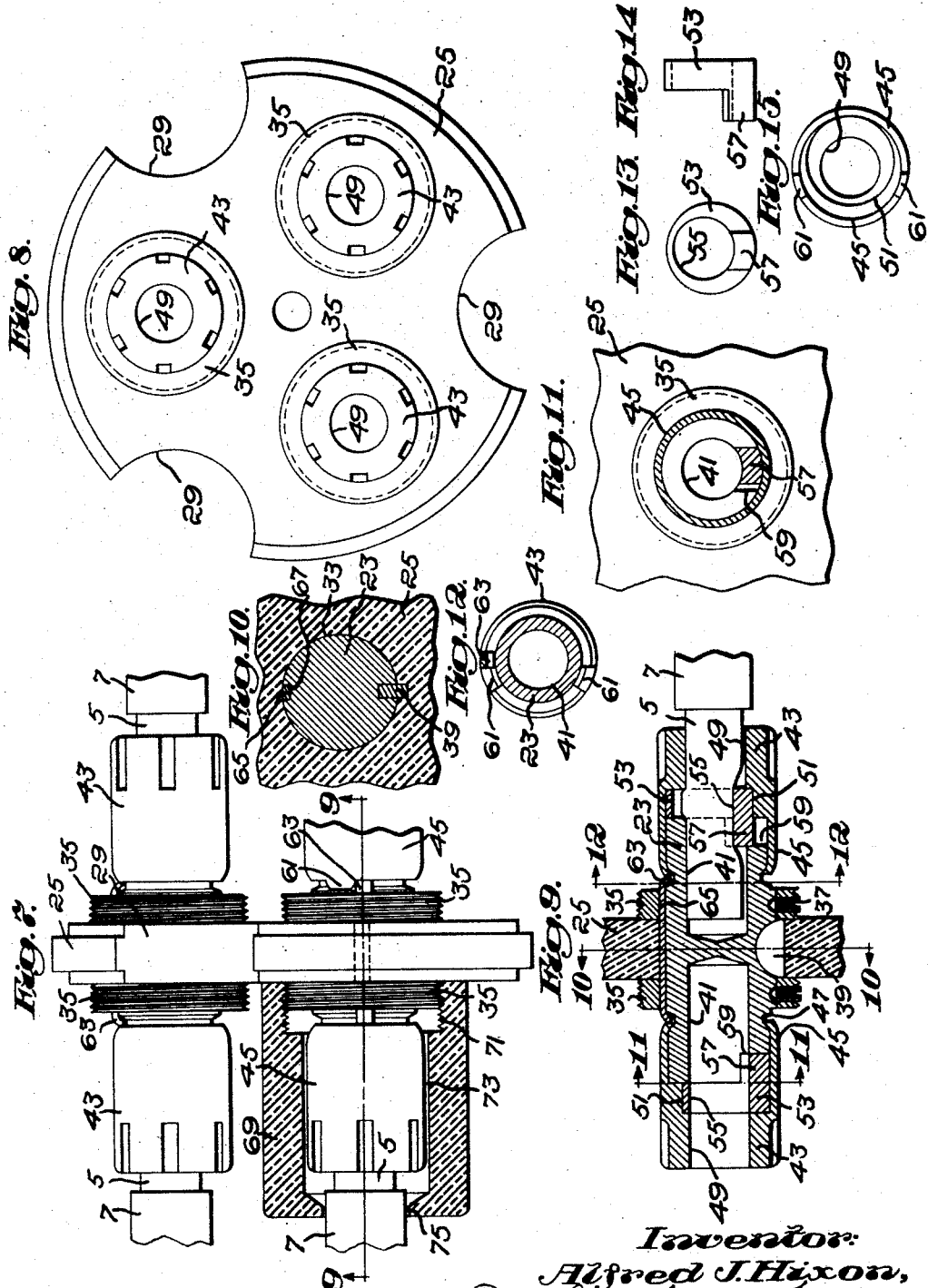

2,139,125

UNITED STATES PATENT OFFICE 2,139,125

CONNECTING DEVICE FOR ELECTRICAL CONDUCTORS

Alfred J. Hixon, Braintree, Mass.

Application July 13, 1934, Serial No. 734,971

8 Claims. (Cl. 173—268)

My invention relates to connecting devices for electrical conductors as, for example, devices for splicing cables, connecting cables to junction and other distributing boxes, and devices for similar uses.

The invention will be best understood from the following description when read in the light of the accompanying drawings of several examples of the invention, the scope of which latter will be more particularly pointed out in the appended claims.

In the drawings:—

Figure 1 is a plan of a cable splice and device for splicing cables according to the invention;

Fig. 2 is a section on the line 2—2 of Fig. 1;

Fig. 3 is a section on the line 3—3 of Fig. 2;

Fig. 4 is a side elevation of a fragment of one end of the casing according to Figs. 1 and 2, with parts omitted;

Fig. 5 is an end elevation of the cable splicing device, with parts omitted, as indicated in Fig. 4;

Fig. 6 is an end elevation of the rotary member, according to Figs. 1 and 2, for operating the cable gripping means, as viewed from the end of said member adjacent the body of the casing;

Fig. 7 is a side elevation, on an enlarged scale, of the conductor uniting means and supporting panel therefor according to Fig. 2, with parts in section and parts broken away;

Fig. 8 is an end elevation according to Fig. 7;

Fig. 9 is a section on the line 9—9 of Fig. 7, with parts omitted;

Figs. 10, 11 and 12 are sections on the lines 10—10, 11—11 and 12—12, respectively, of Fig. 9;

Fig. 13 is an end elevation of the conductor gripper of Fig. 9;

Fig. 14 is a side elevation according to Fig. 13; and

Fig. 15 is an end view of one of the rotatable members of Fig. 9 for operating the conductor gripper before the member is assembled with the remainder of the device, and corresponds to a view in the direction of the arrows on section line 12—12 of Fig. 9.

According to common practice, in splicing cables the lead or other sheathing is stripped from the end portion of each cable and the insulating material of the cable removed to expose the insulated conductor or conductors of the cable. These conductors are then electrically united by skinning them at their end portions and inserting these portions in a sleeve or double-ended solder lug to which they are sweated, after which the cables and lugs are separately taped. A lead sheathing for the splice, which before uniting the conductors was slid over one of the cables, is then slid to place it over the splice, and its ends united to the lead sheathing of the cables by wiping the joint therebetween, after which the interior of the lead casing is filled, through suitable apertures formed therein, with hot insulating compound capable of hardening upon cooling, and then the apertures are sealed by placing the sheet of lead over them and wiping or "burning" the joint.

The splice above described not only is expensive to make, due to the amount of highly skilled labor involved, but has serious electrical and mechanical defects. For exampe, a momentary overheating of the cable, due to an overload or short circuit, will melt the solder uniting the ends of the conductors to the solder lug or sleeve, and upon cooling of the solder this joint is thereafter commonly mechanically and electrically impaired. Further, alternate heating and cooling of the splice and gasing internally of the casing consequent upon this heating cause so-called "breathing" of the casing due to the yieldable nature of sheet lead, and, due to the relative fragile nature of this material, the resulting fatigue causes checks which allow moisture to enter the casing.

It will also be understood by those skilled in the art that cables are commonly connected to junction and other distributing boxes in a manner similar to that above described involving the use of solder lugs or other solder connections for the conductors of the cables and the use of lead casings having wiped joint connections to the lead sheathings of the cables. Such a construction has the same defects and objections as above referred to in connection with the cable splice as commonly heretofore made.

The present invention aims to eliminate the defects of cable splices, connections to junction and other distributing boxes, and similar connections of cables and the conductors thereof, and at the same time secure connections which may be applied with a considerable saving in labor and improved characteristics in respect to strength and mechanical and electrical durability and efficiency.

Referring for the present particularly to Figs. 1 to 15 inclusive, which illustrate one form of cable splice and device for making such a splice according to the invention, each of the two cables 1, as shown, has a lead sheathing 3 and one or more conductors 5, herein three, which individually have insulating covers 7, the insulated conductors collectively being covered by insulation 9 surrounded by the lead cable sheathing.

The casing for the splice, as illustrated, comprises the separable portions 11 and 13. The portion 13, as shown, has a frusto-conical recess 15 which receives a complementary circumferential end flange 17 on the portion 11. Conveniently, the contacting surfaces of the recess 15 and flange 17 form a so-called "ground joint" connection so as to form a water tight joint connection between the portions 11 and 13 when said portions are united by the bolts 19, the latter extending through perforated ears 21 formed integrally with the portions 11 and 13.

As illustrated, the conductors 5 of the cables are electrically and mechanically united to members 23 (Fig. 9), which are carried by a panel 25 of Bakelite or other suitable insulating material. As shown, the panel at its edges is received in a circumferential internal groove of the casing formed by the recess 15 on the end of the casing member 13 and the adjacent recess 27 on the end of the casing member 11. The panel, as shown, is notched at 29 on its periphery, or is otherwise formed, to place the interior of the casing at opposite sides of the panel in communication to permit proper distribution of the insulating compound with which the casing is filled after the splice is made, the casing for this purpose being provided with the threaded openings 31 through which the insulating compound is entered after the splice is made, whereupon the openings may be closed say with common forms of screw plugs.

As shown, the members 23, to which the ends of the conductors 5 of the cable are operatively connected, are inserted in openings 33 in the panel 25 and are held in position on the panel by collars 35 slipped over the members and secured thereto by set screws 37. As shown, rotation between the members 23 and the panel is prevented by keys 39.

In the present embodiment of the invention the members 23 are provided with bores 41 adapted to receive the skinned ends of the conductors 5. If desired, said conductors may be sweated into said openings, but to eliminate the necessity of solder, and the objections hereinbefore pointed out incident to its use, means are preferably provided for mechanically operatively locking the ends of the conductors to said members.

To this end, in the present embodiment of the invention, are provided members 43 each having a sleeve 45 which is rotatably mounted on the cylindrical exterior surface of the end portion of a member 23, the latter being circumferentially grooved, as indicated at 47, and the end of the sleeve 45 being compressed to enter said groove so as to retain the member 43 against longitudinal displacement relative to the member 23. Each member 43 is provided with an axial bore 49 coaxial with the bore 41 in the member 23, and the bore 49 is counterbored at its end adjacent the member 23 to form an eccentric bearing 51 for the exterior surface of a ring 53, which latter is provided with a bore 55 eccentric to the axis of the exterior cylindrical surface of the ring. As shown, the ring 53 is provided on its face adjacent the member 23 with a laterally projecting lug 57, this lug entering and loosely fitting a slot 59 formed in the wall of the member 23, as shown in Figs. 9 and 11.

It will be observed, that when the member 43 is rotated relative to the member 23, the ring 53 is held against substantial rotation relative to the member 23 by engagement of the lug 57 with the walls of the slot 59, but, as the eccentric bearing 51 for said ring is rotated with the member 43, the ring will in consequence be moved laterally to move its bore 55 laterally relative to the permanently aligned bores 41 and 49. The conductor 5 is inserted in the registering bores 49, 55 and 41 when the parts are in their positions illustrated at the left hand side of Fig. 9. After the conductor is inserted the member 43 is rotated to move the parts into their positions shown at the right hand side of Fig. 9 to cause the ring 53 to grip the conductor 5, the ring biting into the conductor, which action is facilitated due to the fact that the conductor is commonly stranded.

For determining when the parts are in the positions illustrated at the right and left hand sides, respectively, of Fig. 9, each sleeve 45, as shown, is provided with a pair of lugs 61, and, cooperating with said lugs, is a stop member 63 which herein is in the form of a bar 65 inserted in a slot 67 on the cylindrical surface of the intermediate portion of the member 23, the ends of the bar being bent downward and entering the grooves 47 in the path of the lugs 61. When one of the lugs 61 is against the stop the parts are in their positions illustrated at the left hand side of Fig. 9, and when the member 43 is rotated to move the other lug 61 against the stop 63 the parts will be in the position shown at the right hand side of Fig. 9.

As illustrated, each of the collars 35 is exteriorly screw threaded for attachment thereto of an insulating sleeve 69 of insulating material such as Bakelite, the sleeve being provided with a bore having the screw threaded portion 71 for engaging the exterior screw threads on the collar, a portion 73 which receives the members 23 and 43, and a portion 75 through which passes the insulated portion 7 of the conductor 5.

In the present embodiment of the invention, the cables 1 pass through openings in the ends of the casing for the splice, which casing is provided with means for gripping the cable so as securely to fasten it thereto, and with means for packing the joint between the walls of the opening and the cable for rendering the joint water tight. To this end, as shown, the ends of the casing members 11 and 13 have reduced diameter portions 77 which are exteriorly screw-threaded for receiving the internal screw threads of a sleeve member 79, the end surface 81 of said sleeve member preferably being finished and adapted to abut against the finished shoulder 83 at the inner end of said reduced diameter portion 77. As shown, each end of the casing has a bore 85 aligned with the axial bore 87 of the adjacent sleeve member 79. The bores 85 and 87, as shown, are provided with coaxial counterbores 89 and 91, respectively, which receive the end portions of a split ring or sleeve 93 surrounding the cable. Surrounding the split sleeve is a ring 95 which has a bore 97 the axis of which is eccentric to the axis of its exterior cylindrical surface, which latter rotatably fits a cylindrical bearing 99 formed as a counterbore in the sleeve 79, the axis of which bearing is eccentric to the axis of the bores 85 and 87. As shown, one side of the projection formed by the reduced diameter portion 77 at the end of the casing is of greater length than the opposite side so as to form at opposite sides of said projection shoulders 101, while the ring 95 is similarly formed to provide at opposite sides thereof shoulders 103 cooperating with the shoulders 101 to prevent substantial rotation of the ring in either direction relative to the projection 77 of the casing.

By reason of the above described construction, when one of the sleeve members 79 is rotated relative to the adjacent projection 77, the eccentric bearing 99 for the ring 95 will be rotated, and substantial rotation of the ring being prevented, the latter will be moved laterally relative to said projection and sleeve member 79. When the parts are in the position illustrated at the left hand end of Fig. 2, the bore 97 of the ring will be coaxial with the bores 85 and 87, but upon rotating the member 79 through a half turn said bore 97 will be moved laterally relative to the openings 85 and 87, this action being similar to that heretofore described with relation to the ring 53 of Figs. 9, 13 and 14 for gripping the conductors of the cable. Movement of the sleeve 93 laterally is prevented by its engagement at opposite ends thereof with the walls of the counterbores 89 and 91, and as a result the sleeve is contracted when the member 79 is rotated, which causes the sleeve to grip the cable and to bite into the lead sheathing 3 thereof as indicated at the right hand side of Fig. 2.

For insuring that the cable will make a water tight joint with the casing, in the present embodiment of the invention the sleeve member 79 has a reduced diameter portion 105 on which is adapted to be threaded a cap 107, the cap having the interior frusto-conical surface 109 opposed to the oppositely inclined frusto-conical surface 111 on the end of the sleeve member 79 for cooperating with and compressing a suitable packing 113 surrounding the cable.

Conveniently, for holding the conductors 5 in spaced relation within the casing, and for causing them properly to enter the conductor uniting members 23, and facilitating making the splice, spacing means 115 are provided, the latter being formed of Bakelite or other insulating material and comprising cylindrical members each having a frusto-conical end portion 117, said members being provided on their exteriors with grooves 119 of arcuate cross-section for receiving and guiding the conductors.

In forming the splice above described, the packing caps 107, and then the casing members 11 and 13, are slipped over the ends of the cables, with the rings 95 and split sleeves 93 in position and the sleeve members 79 backed off one-half turn, the latter as indicated at the left hand side of Fig. 2. The ends of the cables are then stripped, and preferably, but not necessarily, flanged, as indicated at 121, the flanges conveniently being at such distances from the ends of the cables as to bring the flanges against the interior annular shoulders 123 at the ends of the members 11 and 13 after the casing members are drawn together upon completion of the splice. The insulated conductors 5 are then exposed and their ends skinned, and are bent over the members 115. A sleeve 69 is slid over the end of each of the conductors, as indicated at the lower right hand side of Fig. 2. The skinned ends of the conductors are then entered into the bores of the conductor uniting members 23, and the relatively rotatable members 43 on said members 23 are then rotated to cause the conductors to be secured to the members 23. The insulating sleeves 69 are now slid over the members 23 and screwed on the collars 35. The halves 11 and 13 of the casing may then be slid along the cable to bring them together, and the bolts 19 placed in position and tightened. Next the caps 79 are rotated to bring their end faces 81 up against the shoulders 83, white lead or the like preferably being placed in the spaces between the shoulders 81 and 83, or, if desired, over the screw threads on the projection 77 preparatory to screwing the cap 79 on said projection, so as to make a water tight joint between the cap member and the casing. The packing 113 is then wrapped around the cable adjacent the end of the cap 79, unless the packing is in the form of an integral ring in which latter case it may be placed in the cap 107 before the latter is placed on the cable, and the cap 107 is screwed on the member 79 to pack the joint about the cable.

It will be understood, that although a cable with three conductors is herein shown, the invention is equally applicable to cables with one or any number of conductors, and is further applicable to conductors which have other than lead sheaths.

I claim:

1. A housing for the end of an insulated cable or the like having, in combination, a casing provided with an opening through which the end of said cable may be entered into the casing, radially contractible means carried by said casing for gripping the insulated portion of the cable within said opening substantially throughout the circumference thereof for securing the cable to the casing, means for contracting said radially contractible means comprising a ring surrounding said contractible means and movable as a body radially of said opening, and means having a connection with said ring for so moving it comprising a ring member surrounding said cable and rotatably mounted on said casing.

2. A housing for the end of an insulated cable or the like having, in combination, a casing provided with an opening through which the end of said cable may be entered into the casing, means carried by said casing for gripping the insulated portion of the cable within said opening comprising a contractible resilient split ring for securing the cable to the casing, a ring part carried by said casing and surrounding said split ring, and means having a connection with said part for bodily moving it radially of said split ring for contracting the latter comprising a second ring part surrounding the cable and rotatably mounted on said casing.

3. A housing for the end of an insulated cable or the like having, in combination, a casing provided with an opening through which the end of said cable may be entered into the casing, means carried by said casing for gripping the insulated portion of the cable within said opening for securing it to the casing, said means comprising a contractible resilient split ring contacting the cable, a ring part for contracting said split ring, which part is carried by said casing and surrounds said split ring, a second ring part surrounding the cable and having a bearing on said casing, said first mentioned ring part having a bearing on said second ring part, one of said bearings being coaxial with the cable and the other eccentric therewith whereby when said second ring part is rotated on its bearing said first mentioned ring part will be moved radially of the cable.

4. A housing for the end of an insulated cable or the like having, in combination, a casing member provided with an opening through which the end of said cable may be entered into the casing, means operatively carried by said casing member for gripping the insulated portion of the cable within said opening for securing it to the casing, said means comprising a hollow part surrounding the cable and rotatable relative to said casing member, a split ring surrounding the cable, spaced mountings formed in said part and casing member respectively for receiving the exterior surface of said ring, a ring member surrounding said split ring between said mountings, said ring member having an annular surface eccentric to the axis of said split ring, and means comprising an eccentric bearing for receiving said annular surface formed on one of the members constituted by said part and casing member and a stop connection between the other and said ring member for causing the latter to be moved laterally for contracting said split ring when said part is rotated relative to said casing member.

5. A housing for the end of an insulated cable having, in combination, a casing provided with an opening through which the end of said cable may be entered into the casing, means for gripping the insulated portion of the cable within said opening comprising a contractible gripper restrained against bodily movement relative to said casing, means surrounding and having a connection with said gripper and bodily movable radially of the cable for contracting said gripper, means surrounding the cable and rotatable relative to the casing and having a connection with the last mentioned means for so moving it, and packing means for the joint between the cable and the walls of said opening.

6. A device for gripping a cable or the like having, in combination, a pair of generally aligned relatively rotatable members having aligned openings coaxial with the axis of relative rotation of said members for receiving the cable, a ring having a bore eccentric to the axis thereof, a bearing for said ring on one of said members eccentric to said axis of relative rotation, cooperating abutments for preventing substantial axial rotation of said ring relative to the other of said members, a split sleeve within the bore of said ring, and a bearing for an exterior end surface of said ring on at least one of said members coaxial with said axis of relative rotation.

7. A housing for the end of an insulated cable having, in combination, a casing having a relatively rotatable part formed with an opening through which the cable may be entered into the casing, means surrounding the cable and movable as a body radially thereof, means forming a connection between said part and the first mentioned means for causing the latter to be so moved by rotation of said part, contractible means surrounding the cable and operated by such radial movement of said first mentioned means for gripping the insulated portion of the cable for operatively securing the latter to the casing, and means carried by said part for packing the joint between it and said cable.

8. A housing for the end of an insulated cable having, in combination, a casing having a relatively rotatable part formed with an opening through which the cable may be entered into the casing, means surrounding the cable and movable as a body radially thereof, means forming a connection between said part and the first mentioned means for causing the latter to be so moved by rotation of said part, contractible means surrounding the cable and operated by such radial movement of said first mentioned means for gripping the insulated portion of the cable substantially throughout its circumference for operatively securing the latter to the casing, and means carried by said part for packing the joint between it and said cable.

ALFRED J. HIXON.